Sargent & Flanders,
Animal Tether.
Nº 68,906. Patented Sep. 17, 1867.
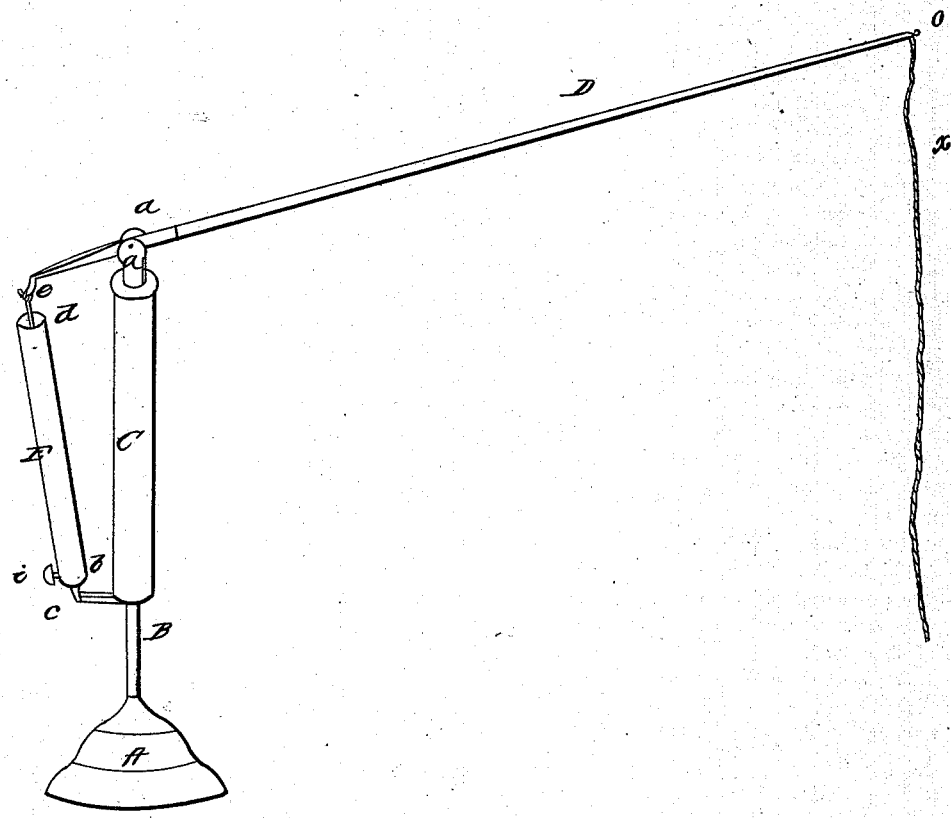
Witnesses
J. S. Porter
L. Hill
Inventor
W S Sargent & F Flanders by
Brown & Beadle attys

United States Patent Office.

WALTER S. SARGENT AND FREDERICK FLANDERS, OF FRANKLIN, NEW HAMPSHIRE.

Letters Patent No. 68,906, dated September 17, 1867.

---

IMPROVEMENT IN ANIMAL TETHER.

---

*The Schedule referred to in these Letters Patent and making part of the same.*

---

TO ALL WHOM IT MAY CONCERN:

Be it known that we, W. S. SARGENT and F. FLANDERS, of Franklin, in the county of Merrimack, and State of New Hampshire, have invented a new and improved Animal Tether; and we do hereby declare that the following is a full and exact description of the same, reference being had to the accompanying drawings, and to the letters of reference marked thereon.

This invention consists in the combination of a cylinder and piston, with the usual appliances common to animal tethers, as generally constructed, by which means the weight of the atmosphere is made to accomplish the same result as is ordinarily obtained by the use of springs or weights.

To enable others to make and use our invention, we will now proceed to describe its construction and operation.

A represents a base-block made of any suitable material, and of sufficient size to enable it to rest securely in any place in which it may be put. B represents a standard firmly fastened in the base-block A, or firmly set in the ground, over which is placed the socket C, fitting loosely and revolving freely upon it; rising from the top of which socket are the ears $a$ $a$, between which is pivoted the tethering-pole D. At the bottom of the socket C, upon one side, is formed the projection $b$, to which is pivoted at the point $c$ the termination of the cylinder E. Within this cylinder is the piston $d$, the rod of which terminates in an eye, $e$, in which eye is hooked the short arm of the tethering-pole. Near the bottom of the cylinder is placed the screw-stopper $i$, fitted closely into its receptacle, in order to admit no air, and so arranged as to be readily removed. The tethering-pole D is made of any suitable material, and of a length proper for the purpose desired. At its outer extremity it is furnished with an eye, $o$, to which is attached the tethering-line $x$.

From this description the operation of our invention will be readily understood. The air having been exhausted from the cylinder, by pushing down the piston with the stopper removed, the stopper being replaced, the apparatus is in condition to operate. The line being of suitable length, the animal is attached and left free to graze. When in feeding he exerts a strain upon the rope by moving at a distance from the base, the long arm of the pole is depressed, and the limit of his range is extended. The depressing of the long arm of the pole has the effect to produce a vacuum in the cylinder, for the latter being air-tight, and the piston being at its bottom, the raising of the piston must necessarily create a vacuum. Upon moving nearer the base the weight of the atmosphere, the strain being removed from the rope, immediately depresses the piston, and consequently elevates the long arm of the pole, and with it the rope, thus removing the latter from danger of entanglement by the animal. The socket revolving freely upon the standard, enables the animal to have the same extent of range on all sides. The power to be exerted can be readily regulated by increasing or decreasing the amount of vacuum in the cylinder, by means of the screw-stopper $i$, by which means, also, the piston can be easily removed at any time. The necessary play of the cylinder to accommodate the different positions of the tethering-pole is allowed by the pivot at the point $c$.

We are well aware that animal tethers like this in their general construction and arrangement are in common use; but in all that we have ever seen, weights or springs are used to accomplish the result obtained by our cylinder and piston. We consider our arrangement in this respect much superior, in view of the fact that the use of weights renders the tether exceedingly cumbersome and top-heavy, and springs, by use and exposure, are liable to loss of elasticity, and breakage, while in our invention the atmosphere takes the place of the spring, being free from the objections above stated, and the whole combination is light, effective, and durable.

Having thus fully described our invention, what we claim as new, and desire to secure by Letters Patent, is—

The combination of the cylinder E and piston $d$ with the base-block A, standard B, socket C, and tethering-pole D, substantially as described.

WALTER S. SARGENT,
FREDERICK FLANDERS.

Witnesses:
ROBT. W. BENNETT,
DANIEL BEEMAN.